(12) United States Patent
Kim et al.

(10) Patent No.: US 10,894,245 B2
(45) Date of Patent: Jan. 19, 2021

(54) METHOD FOR PREPARING SUPERABSORBENT POLYMER

(71) Applicant: LG Chem, Ltd., Seoul (KR)

(72) Inventors: Jun Kyu Kim, Daejeon (KR); Jae Ho Oh, Daejeon (KR); Yeong Bin Jo, Daejeon (KR); Tae Hwan Jang, Daejeon (KR)

(73) Assignee: LG Chem, Ltd.

( * ) Notice: Subject to any disclaimer, the term of this patent is extended or adjusted under 35 U.S.C. 154(b) by 113 days.

(21) Appl. No.: 16/338,913

(22) PCT Filed: Feb. 6, 2018

(86) PCT No.: PCT/KR2018/001599
§ 371 (c)(1),
(2) Date: Apr. 2, 2019

(87) PCT Pub. No.: WO2018/151453
PCT Pub. Date: Aug. 23, 2018

(65) Prior Publication Data
US 2019/0224645 A1 Jul. 25, 2019

(30) Foreign Application Priority Data

Feb. 16, 2017 (KR) .................. 10-2017-0021051
Feb. 5, 2018 (KR) .................. 10-2018-0014095

(51) Int. Cl.
| | | |
|---|---|---|
| C08F 2/00 | (2006.01) | |
| B01J 20/26 | (2006.01) | |
| C08F 220/06 | (2006.01) | |
| C08J 3/075 | (2006.01) | |
| B01J 20/28 | (2006.01) | |
| B01J 20/30 | (2006.01) | |
| C08J 3/24 | (2006.01) | |
| C08J 3/12 | (2006.01) | |
| C08F 2/38 | (2006.01) | |

(52) U.S. Cl.
CPC ....... B01J 20/267 (2013.01); B01J 20/28016 (2013.01); B01J 20/3021 (2013.01); B01J 20/3085 (2013.01); C08F 2/38 (2013.01); C08F 220/06 (2013.01); C08J 3/075 (2013.01); C08J 3/12 (2013.01); C08J 3/24 (2013.01); C08J 3/245 (2013.01); C08F 2810/20 (2013.01); C08J 2333/02 (2013.01)

(58) Field of Classification Search
CPC ............. B01J 20/267; B01J 20/28016; B01J 20/3085; B01J 20/3021; B01J 20/305; C08J 3/12; C08J 3/24; C08J 3/075; C08J 3/245; C08J 2333/02; C08F 2/38; C08F 220/06; C08F 2810/20; C08F 2/40; C08F 6/008; C08F 2/00
See application file for complete search history.

(56) References Cited

U.S. PATENT DOCUMENTS

| | | |
|---|---|---|
| 2007/0281029 A1 | 12/2007 | Lee et al. |
| 2008/0200623 A1 | 8/2008 | Weismantel et al. |
| 2009/0192035 A1 | 7/2009 | Stueven et al. |
| 2009/0239071 A1 | 9/2009 | Stueven et al. |
| 2009/0258994 A1 | 10/2009 | Stueven et al. |
| 2010/0003209 A1 | 1/2010 | Braig et al. |
| 2010/0056739 A1 | 3/2010 | Funk et al. |
| 2010/0068520 A1 | 3/2010 | Stueven |
| 2010/0197877 A1 | 8/2010 | Funk et al. |
| 2012/0141792 A1 | 6/2012 | Stueven et al. |
| 2014/0121322 A1* | 5/2014 | Fricker .................. C08F 2/14 525/55 |
| 2014/0302321 A1 | 10/2014 | Stueven et al. |
| 2015/0175517 A1 | 6/2015 | Yoshida et al. |
| 2017/0037172 A1 | 2/2017 | Stueven et al. |
| 2017/0066862 A1 | 3/2017 | Matsumoto et al. |

FOREIGN PATENT DOCUMENTS

| | | |
|---|---|---|
| EP | 1097946 A2 | 5/2001 |
| JP | 2002212204 A | 7/2002 |
| JP | 2005162834 A | 6/2005 |
| JP | 2009523874 A | 6/2009 |
| JP | 2009543915 A | 12/2009 |
| JP | 2009543922 A | 12/2009 |
| JP | 2010521580 A | 6/2010 |
| JP | 2014205856 A | 10/2014 |
| JP | 2014240501 A | 12/2014 |
| KR | 100725024 B1 | 5/2007 |
| KR | 20110082518 A | 7/2011 |
| KR | 20160149238 A | 12/2016 |
| WO | 2010040466 A1 | 4/2010 |
| WO | 2014002886 A1 | 1/2014 |
| WO | 2015163514 A1 | 10/2015 |

OTHER PUBLICATIONS

International Search Report for PCT/KR2018/001599, dated May 15, 2018.
Odian, George, "Principles of Polymerization", Second Edition, John Wiley & Sons, 1981, 3 pages.
Schwalm, Reinhold, "UV Coatings: Basics, Recent Developments and New Applications", Elsevier , Dec. 2006, 3 pages.
Basic Acrylic Monomer Manufacturers, Inc., Acrylic Acid a Summary of Safety and Handling, 2013, 75 pgs., 4th Edition.
Buchholz et al., Modern Superabsorbent Polymer Technology, 1998, 51 pgs., Wiley-VCH.
Cutie et al., The Effects of MEHQ on the Polymerization of Acrylic Acid in the Preparation of Superabsorbent Gels, accepted Oct. 1996, 14 pgs., John Wiley & Sons, Inc.
Japanese Acrylic Ester Manufacturers (JAEM), Safety Guidebook for Handling of Acrylic Acid and Acrylic Esters, Mar. 2004, 72 pgs., 6th Edition.
Third Party Observation for PCT/KR2018/001599, submitted Jun. 11, 2019.

* cited by examiner

*Primary Examiner* — Robert C Boyle
(74) *Attorney, Agent, or Firm* — Lerner, David, Littenberg, Krumholz & Mentlik, LLP

(57) ABSTRACT

The present invention relates to a method for preparing a superabsorbent polymer having excellent absorption performance, and more specifically, to a method for preparing a superabsorbent polymer that can effectively inhibit the initiation of a polymerization reaction in a pipe, before being introduced into a polymerization reactor, thus preventing process trouble.

12 Claims, No Drawings

METHOD FOR PREPARING SUPERABSORBENT POLYMER

CROSS-REFERENCE TO RELATED APPLICATIONS

This application is a national phase entry under 35 U.S.C. § 371 of International Application No. PCT/KR2018/001599, filed Feb. 6, 2018, which claims priority to Korean Patent Application No. 10-2017-0021051 filed Feb. 16, 2017 and Korean Patent Application No. 10-2018-0014095 filed Feb. 5, 2018, the disclosures of which are herein incorporated by reference in their entirety.

TECHNICAL FIELD

The present invention relates to a method for preparing a superabsorbent polymer having excellent absorption performance, and more specifically, to a method for preparing a superabsorbent polymer that can effectively inhibit the initiation of a polymerization reaction in a pipe, before being introduced into a polymerization reactor.

BACKGROUND ARTS

A super absorbent polymer (SAP) is a synthetic polymer material that can absorb moisture of 500 to 1000 times its own weight, and is also called a super absorbent material (SAM), an absorbent gel material (AGM), etc. according to developing companies. The superabsorbent polymer began to be commercialized for sanitary items, and currently, it is being widely used for hygienic goods such as disposable diapers and so on, water-holding materials for soil, water stop materials for civil engineering and architecture, sheets for raising seedling, freshness preservatives in the field of food circulation, a fomentation material, etc.

In most cases, such superabsorbent polymer is being widely used in the field of hygienic goods such as for diapers, sanitary pads, etc. It is usual for the superabsorbent polymer to be included in hygienic goods while being spread in pulp. However, recently, there has been a continued effort to provide hygienic goods such as diapers, etc. with a thinner thickness, and for this, development of diapers with decreased pulp content, or even so-called pulpless diapers in which pulp is not used at all, is actively progressing.

As such, in the case of hygienic goods with decreased pulp content or without pulp, a superabsorbent polymer is included at a relatively high rate, and such superabsorbent polymer particles are inevitably included in multilayers in the hygienic goods. In order for the superabsorbent polymer particles included in multilayers to more efficiently absorb liquid such as urine, the superabsorbent polymer needs to exhibit high absorption performance and absorption speed.

Such superabsorbent polymer is made by drying, grinding, and sieving a hydrogel polymer prepared by crosslinking polymerization of monomers including a water soluble ethylenically unsaturated carboxylic acid or salts thereof, or by additional surface crosslinking.

During the crosslinking polymerization of the above-explained monomers, an appropriate kind of polymerization initiator or polymerization inhibitor is used, and the degree of progression of a polymerization reaction is controlled through process conditions of the reaction, and particularly, in order to activate polymerization, a method of removing dissolved oxygen existing in the monomer mixture before being introduced into a polymerization reactor is known.

Further, in order to achieve excellent properties of the finally prepared superabsorbent polymer, there is a need to exactly control the initiation or inhibition of a reaction, which is very difficult due to the properties of a radical reaction, and the properties of a superabsorbent polymer may be deteriorated according to the amount of polymerization initiator or polymerization inhibitor used.

Particularly, in order to use a small amount of polymerization initiator, the temperature of a neutralized solution obtained by neutralizing a water soluble ethylenically unsaturated carboxylic acid or salts thereof should be increased, but in this case, polymerization may be initiated in a transfer line such as a pipe, etc. instead of a polymerization reactor, thus making continuous operation difficult.

Accordingly, there is a demand for studies on efficiently controlling the initiation and inhibition of a polymerization reaction, while reducing the amount of polymerization initiator used and progressing polymerization at a high temperature.

DETAILED DESCRIPTIONS OF THE INVENTION

Technical Problems

It is an object of the present invention to provide a method for preparing a superabsorbent polymer that can reduce the amount of polymerization initiator used, compared to the existing polymerization method, and simultaneously, to effectively control the initiation and inhibition of a polymerization reaction.

Technical Solutions

The present invention provides a method for preparing a superabsorbent polymer including the steps of:

A) introducing an oxygen-containing gas into an aqueous monomer mixture including water soluble ethylenically unsaturated monomers having acid groups of which at least a part are neutralized, a crosslinking agent, and a polymerization inhibitor that inhibits polymerization of the water soluble ethylenically unsaturated monomers in the presence of oxygen;

B) transferring the aqueous monomer mixture into which the oxygen-containing gas is introduced to a polymerization reactor;

C) removing the oxygen from the aqueous monomer mixture immediately before the aqueous monomer mixture into which the oxygen-containing gas is introduced is introduced into the polymerization reactor; and D) progressing crosslinking polymerization of the water soluble ethylenically unsaturated monomers in the polymerization reactor, to form a hydrogel polymer including a first crosslinked polymer.

Advantageous Effects

According to the method for preparing a superabsorbent polymer of the present invention, polymerization can be progressed at a high temperature, and the amount of a polymerization initiator used can be reduced compared to the existing polymerization method, and simultaneously, the initiation and inhibition of a polymerization reaction can be effectively controlled.

EMBODIMENTS

The method for preparing superabsorbent polymer according to the present invention includes the steps of:

A) introducing an oxygen-containing gas into an aqueous monomer mixture including water soluble ethylenically unsaturated monomers having acid groups of which at least a part are neutralized, a crosslinking agent, and a polymerization inhibitor that inhibits polymerization of the water soluble ethylenically unsaturated monomers in the presence of oxygen;

B) transferring the aqueous monomer mixture into which the oxygen-containing gas is introduced to a polymerization reactor;

C) removing the oxygen from the aqueous monomer mixture immediately before the aqueous monomer mixture into which the oxygen-containing gas is introduced is introduced into the polymerization reactor; and D) progressing crosslinking polymerization of the water soluble ethylenically unsaturated monomers in the polymerization reactor, to form a hydrogel polymer including a first crosslinked polymer.

As used herein, words "first", "second" and the like are used to explain various constructional elements, and they are used only to distinguish one constructional element from other constructional elements.

Further, terms used herein are only to explain specific embodiments, and are not intended to limit the present invention. A singular expression includes a plural expression thereof, unless it is expressly stated or obvious from the context that such is not intended. As used herein, the terms "comprise", "have", etc. are intended to designate the existence of practiced characteristics, numbers, steps, constructional elements, or combinations thereof, and they are not intended to preclude the possibility of existence or addition of one or more other characteristics, numbers, steps, constructional elements, or combinations thereof.

Although various modifications can be made to the present invention and the present invention may have various forms, specific examples will be illustrated and explained in detail below. However, it should be understood that these are not intended to limit the present invention to a specific disclosure, and that the present invention includes all modifications, equivalents, or replacements thereof without departing from the spirit and technical scope of the invention.

Hereinafter, the method for preparing a superabsorbent polymer of the present invention will be explained in detail according to each step.

The method for preparing a superabsorbent polymer according to one aspect of the present invention includes the steps of:

A) introducing an oxygen-containing gas into an aqueous monomer mixture including water soluble ethylenically unsaturated monomers having acid groups of which at least a part are neutralized, a crosslinking agent, and a polymerization inhibitor that inhibits polymerization of the water soluble ethylenically unsaturated monomers in the presence of oxygen;

B) transferring the aqueous monomer mixture into which the oxygen-containing gas is introduced to a polymerization reactor;

C) removing the oxygen from the aqueous monomer mixture immediately before the aqueous monomer mixture into which the oxygen-containing gas is introduced is introduced into the polymerization reactor; and D) progressing crosslinking polymerization of the water soluble ethylenically unsaturated monomers in the polymerization reactor, to form a hydrogel polymer including a first crosslinked polymer.

The step D) is a step of forming a hydrogel polymer, wherein the crosslinking polymerization of an aqueous monomer mixture including water soluble ethylenically unsaturated monomers having acid groups of which at least a part are neutralized is progressed together with a crosslinking agent and a polymerization initiator.

The water soluble ethylenically unsaturated monomers making up the first crosslinked polymer may be any monomers commonly used in the preparation of a superabsorbent polymer. As non-limiting examples, the water soluble ethylenically unsaturated monomer may be a compound represented by the following Chemical Formula 1:

$$R_1\text{-}COOM^1 \qquad \text{[Chemical Formula 1]}$$

wherein, in Chemical Formula 1, $R_1$ is a C2-5 alkyl group including an unsaturated bond, $M^1$ is a hydrogen atom, a monovalent or divalent metal, an ammonium group, or an organic amine salt.

Preferably, the monomers may be one or more selected from the group consisting of acrylic acid, methacrylic acid, and monovalent metal salts, divalent metal salt, ammonium salts, and organic amine salts of these acids. It is preferable that acrylic acid or a salt thereof is used as the water soluble ethylenically unsaturated monomer, because a superabsorbent polymer with an improved absorption property can thereby be obtained. In addition, as the monomers, one or more selected from the group consisting of anionic monomers and salts thereof selected from maleic anhydride, fumaric acid, crotonic acid, itaconic acid, 2-acryloylethane sulfonic acid, 2-methacryloylethane sulfonic acid, 2-(meth)acryloylpropane sulfonic acid, and 2-(meth)acrylamide-2-methylpropane sulfonic acid; non-ionic hydrophilic group-containing monomers selected from (meth)acrylamide, N-substituted (meth)acrylate, 2-hydroxyethyl (meth)acrylate, 2-hydroxypropyl (meth)acrylate, methoxy polyethylene glycol (meth)acrylate, and polyethylene glycol (meth)acrylate; amino group-containing unsaturated monomers selected from (N,N)-dimethylaminoethyl (meth)acrylate and (N,N)-dimethylaminopropyl (meth)acrylamide; and quaternized products thereof, may be used.

Here, the water soluble ethylenically unsaturated monomers may have acid groups, and at least a part of the acid groups may be neutralized. Preferably, monomers that are partially neutralized with an alkali substance such as sodium hydroxide, potassium hydroxide, ammonium hydroxide, etc. may be used.

Here, the neutralization degree of the monomers may be 40 to 95 mol %, 40 to 80 mol %, or 45 to 75 mol %. If the neutralization degree is too high, neutralized monomers may be precipitated, thus rendering smooth progression of polymerization difficult, and to the contrary, if the neutralization degree is too low, the absorption of the polymer may be significantly lowered, and the polymer may exhibit a rubber-like property, which is difficult to handle. However, the present invention is not necessarily limited to the above range, and the neutralization degree may vary according to the properties of the final superabsorbent polymer.

Further, the concentration of the water soluble ethylenically unsaturated monomers in the aqueous monomer mixture may be appropriately controlled considering a polymerization time, reaction conditions, etc., and preferably, it may be 20 to 90 wt %, or 40 to 65 wt %. Such a concentration range may be advantageous in that a need to remove non-reacted monomers after polymerization is obviated using a gel effect exhibited during the polymerization reaction of an aqueous solution of a high concentration, and grinding efficiency is controlled during the grinding of polymer as described below. However, if the concentration of monomers is too low, the yield of the superabsorbent polymer may become low. To the contrary, if the concentration of monomers is too high, process problems may be generated such as precipitation of a part of the monomers or a decrease in the grinding efficiency during the grinding of the polymerized hydrogel polymer, and the properties of the superabsorbent polymer may be deteriorated.

It is usual for common ethylenically unsaturated monomers such as acrylic acid, methacrylic acid, etc. to include a polymerization inhibitor so as to prevent polymerization during storage or transfer. In general, a hydroquinone ether-based compound is largely used, and specific examples thereof may include a monomethyl ether of hydroquinone (MEHQ), etc. The polymerization inhibitor is used in a content of about 10 ppmw to about 300 ppmw based on the ethylenically unsaturated monomers, and preferably, it is used in a content of about 50 ppmw to about 250 ppmw, or about 150 ppmw to about 220 ppmw.

Since the polymerization inhibitor exhibits the effect of inhibiting polymerization of ethylenically unsaturated monomers in the presence of oxygen, there is a need to maintain an oxygen partial pressure beyond a certain level together with the polymerization inhibitor during the transfer or storage of ethylenically unsaturated monomers, and there is a need to remove oxygen existing in the monomers before initiating polymerization.

As the polymerization initiator, a thermal polymerization initiator or a photopolymerization initiator may be used according to polymerization methods. However, even in the case of photopolymerization, since a certain amount of heat is generated by UV irradiation, etc., and heat is generated to some degree according to the progression of an exothermic polymerization reaction, a thermal polymerization initiator may be additionally included.

As the photopolymerization initiator, one or more selected from the group consisting of benzoin ether, dialkyl acetophenone, hydroxyl alkylketone, phenyl glyoxylate, benzyl dimethyl ketal, acyl phosphine, and α-aminoketone may be used. Among them, as an example of the acyl phosphine, commercially available Lucirin TPO, i.e., 2,4,6-trimethyl-benzoyl-trimethyl phosphine oxide, may be used. More various photopolymerization initiators are described in Reinhold Schwalm, "UV Coatings: Basics, Recent Developments and New Applications (Elsevier 2007)", page 115, and are not limited to the above-described examples.

Further, as the thermal polymerization initiator, at least one selected from the group consisting of a persulfate initiator, an azo initiator, hydrogen peroxide, and ascorbic acid may be used.

Specific examples of the persulfate initiator may include sodium persulfate ($Na_2S_2O_8$), potassium persulfate ($K_2S_2O_8$), ammonium persulfate (($NH_4)_2S_2O_8$), etc.

In addition, specific examples of the azo initiator may include 2,2-azobis(2-amidinopropane)dihydrochloride, 2,2-azobis-(N,N-dimethylene)isobutyramidinedihydrochloride, 2-(carbamoylazo)isobutyronitrile, 2,2-azobis[2-(2-imidazolin-2-yl)propane]dihydrochloride, 4,4-azobis-(4-cyanovalericacid), etc.

More various thermal initiators are described in "Principles of Polymerization (Wiley, 1981)", Odian, page 203, and are not limited to the above-described examples.

Such a polymerization initiator may be introduced at a concentration of about 0.001 parts by weight to about 1 part by weight, based on 100 parts by weight of the monomers. That is, if the concentration of the polymerization initiator is too low, polymerization speed may become slow, and the remaining monomers may be extracted in a large quantity in the final product. To the contrary, if the concentration of the polymerization initiator is too high, the polymer chain making up a network may be shortened, and thus water soluble contents may increase and absorbency under pressure may be lowered, thus deteriorating the properties of polymer.

Particularly, in the present invention, the thermal polymerization initiator may be used in an amount of about 0.01 to about 0.5 parts by weight, based on 100 parts by weight of the ethylenically unsaturated monomers. The amount of the thermal polymerization initiator used may have an influence on the properties of the base polymer prepared through the subsequent processes, and particularly, may have an influence on the water soluble content of the base polymer. If the water soluble content increases, the properties of the finally prepared superabsorbent polymer may be deteriorated, and particularly, absorbency under pressure (AUP) and permeability may be deteriorated. Further, if the amount of thermal polymerization initiator used is too small, the efficiency of the polymerization of the hydrogel polymer may be lowered, and thus, various properties of the finally prepared superabsorbent polymer may be deteriorated. Preferably, the thermal polymerization initiator may be used in an amount of about 0.05 to about 0.5 parts by weight, based on 100 parts by weight of the ethylenically unsaturated monomers.

The above-explained polymerization initiators may be included from the beginning in the aqueous monomers mixture of step A), including water soluble ethylenically unsaturated monomers, a crosslinking agent, and a polymerization inhibitor, or they may be introduced immediately before or immediately after the step C) of removing oxygen from the aqueous monomer mixture.

Particularly, when the above-explained thermal polymerization initiator is used, considering the interaction with oxygen, it may be preferable for the thermal polymerization initiator to be separately introduced before the step D), after removing oxygen from the aqueous monomer mixture in the step C).

The polymerization reaction may be conducted in the presence of a crosslinking agent. As the crosslinking agent, any compounds enabling the introduction of crosslinking during the polymerization of the water soluble ethylenically unsaturated monomers may be used. As non-limiting examples of the crosslinking agent, multifunctional crosslinking agents such as N,N'-methylenebisacrylamide, trimethylolpropane tri(meth)acrylate, ethylene glycol di(meth)acrylate, polyethylene glycol(meth)acrylate, propylene glycol di(meth)acrylate, polypropylene glycol(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentaacrylate, glycerin tri(meth)acrylate, pentaerythritol tetraacrylate, triarylamine, ethylene glycol diglycidyl ether, propylene glycol, glycerin, or ethylene carbonate may be used alone or in combination of two or more kinds, but are not limited thereto. Preferably, two kinds of polyethylene glycol diacrylate having different molecular weights may be used.

Such a crosslinking agent may be introduced in an amount of about 0.001 to about 1 part by weight, based on 100 parts by weight of the water soluble ethylenically unsaturated monomers. That is, if the amount of the crosslinking agent introduced is too small, the absorption speed of the polymer may become slow, and gel strength may become weak. To the contrary, if the amount of the crosslinking agent introduced is too large, the absorption force of the superabsorbent polymer may be lowered, and thus it may not be preferable as an absorbent.

In the polymerization reaction, reactants may be prepared in the form of an aqueous monomer mixture, in which the above-explained raw materials including monomers, etc. are dissolved in a solvent. Here, the solvent that can be used is not limited in terms of its construction as long as it can dissolve or disperse the above-explained raw materials, and for example, one or more selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methylethylketone, acetone, methyl amyl ketone, cyclohexanone, cyclopentanone, diethylene glycol monomethyl ether, diethylene glycol ethyl ether, toluene, xylene, butyrolactone, carbitol, methyl cellosolve acetate, N,N-dimethylacetamide, etc. may be used alone or in combination.

The formation of hydrogel polymer through the polymerization of the aqueous monomer mixture may be conducted by a common thermal polymerization method. For example, it may be progressed in a reactor equipped with a stirring axis such as a kneader. In this case, a hydrogel polymer may be obtained by introducing the above-described aqueous monomer mixture into the reactor equipped with a stirring axis such as a kneader, and supplying hot air or heating the reactor to progress thermal polymerization. Here, the hydrogel polymer discharged to the outlet of the reactor may be obtained in the size of a few centimeters to a few millimeters according to the shape of the stirring axis equipped in the reactor. Specifically, the size of the obtained hydrogel polymer may vary according to the concentration of the monomers in the introduced aqueous monomer mixture and the introduction speed, etc., and commonly, a hydrogel polymer with a (weight average) particle diameter of 2 to 50 mm may be obtained.

Meanwhile, as explained above, in order to improve the properties of the base polymer and the finally prepared superabsorbent polymer, it is preferable that a relatively small amount of polymerization initiator is used in the polymerization reaction, and in this case, in order to improve polymerization efficiency, after neutralizing at least a part of the acid groups included in the water soluble ethylenically unsaturated monomers, the aqueous monomer mixture including the neutralized solution, and optionally various additives, of a high temperature is introduced into the polymerization reactor.

For example, the aqueous monomer mixture may be transferred and introduced into a polymerization reactor through a transfer line under a temperature condition of about 40 to about 90 □.

However, if a neutralized solution with increased temperature is introduced into a polymerization reactor so as to improve the efficiency of a polymerization reaction, the polymerization reaction may be initiated at an early stage in a transfer line, etc., and thereby, process trouble such as pipe blocking, etc. may be generated.

The solubility of a gas such as oxygen in water may very sensitively vary according to a temperature and a pressure, as well as the properties such as a polarity of the gas molecule itself.

Specifically, oxygen occupies about 21% of common atmospheric composition, and under such an atmospheric composition, saturation dissolved oxygen in 1 liter of distilled water is about 8.84 mg at about 20 □, and about 1 atm, while saturation dissolved oxygen in 1 liter of distilled water is decreased to about 6.59 mg at about 40 □, and 1 atm. Further, in the process of preparing the superabsorbent polymer of the present invention, instead of distilled water, an aqueous monomer mixture including a neutralized solution, obtained after neutralizing at least a part of the acid groups included in the water soluble ethylenically unsaturated monomers, and optionally various additives as explained above is used, and due to the interaction with other components dissolved in water, the solubility of oxygen itself generally becomes lower than the above-described range.

For example, in the case of the aqueous monomer mixture, at about 20 □, and about 1 atm, saturation dissolved oxygen in 1 liter of the aqueous monomer mixture is about 7.5 to about 8 mg, and at about 40 □, and 1 atm, saturation dissolved oxygen in 1 liter of the aqueous monomer mixture is significantly decreased to about 3.0 to about 4 mg.

However, under these conditions, since the amount of oxygen in the aqueous monomer mixture is not sufficient, it is difficult for a polymerization inhibitor to perform its function, and thus a polymerization reaction may be initiated at an early stage.

Thus, in the present invention, oxygen-containing gas is introduced into the above-explained aqueous monomer mixture including a neutralized solution including a polymerization inhibitor, and optionally various additives, and the aqueous monomer mixture into which oxygen-containing gas is introduced is transferred to a polymerization reactor. In this case, the introduced oxygen may increase the activity of the polymerization inhibitor, thus controlling such that a polymerization reaction does not occur during the transfer process.

Specifically, in the step A), oxygen or an oxygen-containing gas (atmosphere) may be introduced such that a dissolved oxygen rate represented by the following Mathematical Formula 1 may fulfill the range of greater than about 1.0 and equal to or less than about 2.5, preferably about 1.5 or more and about 2.5 or less, and more preferably about 1.7 or more and about 2.3 or less.

$$DO2/DO1 \qquad \text{[Mathematical Formula 1]}$$

In Mathematical Formula 1,

DO1 is the amount of dissolved oxygen (mg/L) in the aqueous monomer mixture, measured immediately before introducing an oxygen-containing gas into the aqueous monomer mixture, and DO2 is the amount of dissolved oxygen (mg/L) in the aqueous monomer mixture, measured immediately after introducing the oxygen-containing gas into the aqueous monomer mixture.

As explained above, in the present invention, oxygen or an oxygen-containing gas is introduced into the above-explained aqueous monomer mixture including a neutralized solution, and optionally various additives, and thereby the aqueous monomer mixture with significantly increased dissolved oxygen is transferred to a polymerization reactor, and thus the progression of a polymerization reaction in a transfer line may be very effectively inhibited, and process trouble such as pipe blocking, etc. may be prevented.

However, when the aqueous monomer mixture into which oxygen is introduced is directly introduced into a polymerization reactor as explained above, a polymerization reaction in the polymerization reactor may be inhibited, and thus reaction efficiency may be deteriorated.

Thus, there is a need to remove the oxygen from the aqueous monomer mixture immediately before the aqueous monomer mixture into which oxygen-containing gas is introduced is introduced into a polymerization reactor, and for example, oxygen may be removed by introducing an inert gas into the aqueous monomer mixture into which oxygen has been introduced.

The inert gas means a gas without reactivity to the monomer and various additives included in the above-explained aqueous monomer mixture, and specifically, it may include a Group 18 gas such as helium (He), neon (Ne), argon (Ar), etc., or carbon monoxide (CO), carbon dioxide ($CO_2$), nitrogen($N_2$), etc., and one or more kinds thereof may be used in combination.

The inert gas may be introduced in the same direction as or an opposite direction to the aqueous monomer mixture to remove oxygen, and it may be mixed with the aqueous monomer mixture by a bubble column, etc., and then, while being discharged, oxygen included in the aqueous monomer mixture can be removed.

The inert gas may be preferably introduced in the same direction to the aqueous monomer mixture, and introduced into the polymerization reactor together.

Through the process, oxygen dissolved in the aqueous monomer mixture may be effectively removed.

Specifically, a dissolved oxygen rate represented by the following Mathematical Formula 2 may be about 0.01 or more, or about 0.05 or more, and about 0.2 or less, preferably about 0.15 or less.

Further, a dissolved oxygen rate represented by the following Mathematical Formula 3 may fulfill the range of about 0.01 to about 0.5, preferably about 0.1 or more, or about 0.2 or more, and about 0.5 or less, about 0.4 or less, or preferably about 0.3 or less.

$DO3/DO2$      [Mathematical Formula 2]

$DO3/DO1$      [Mathematical Formula 3]

In Mathematical Formulas 2 and 3, DO1 and DO2 are as defined in Mathematical Formula 1, and DO3 is the amount of dissolved oxygen (mg/L) in the aqueous monomer mixture, measured immediately after removing oxygen from the aqueous monomer mixture.

Meanwhile, the moisture content of the hydrogel polymer obtained by the above method may be commonly about 40 to about 80 wt %. The "moisture content" is the content of moisture occupied based on the total weight of the hydrogel polymer, and it means a value obtained by subtracting the weight of the polymer of a dry state from the weight of the hydrogel polymer. Specifically, it is defined as a value calculated by measuring the weight loss according to moisture evaporation in the polymer while raising the temperature of the polymer through infrared heating to dry it.

At this time, the drying condition may be set such that the temperature is raised from room temperature to about 180 □ and then maintained at 180 □, and the total drying time may be 20 minutes including a temperature raising step of 5 minutes.

The step E) is a step of drying, grinding, and sieving the hydrogel polymer prepared by the above method to form the base polymer powder, and it is appropriate for the base polymer powder and the superabsorbent polymer obtained therefrom having a particle diameter of about 150 to about 850 μM to be prepared and provided.

More specifically, at least about 95 wt % of the base polymer powder and the superabsorbent polymer obtained therefrom may have particle diameters of about 150 to 850 μM, and less than about 3 wt % thereof may be fine powder with particle diameters of less than about 150 μm. As explained, since the particle diameter distributions of the base polymer powder and superabsorbent polymer are controlled within preferable ranges, the finally prepared superabsorbent polymer may exhibit excellent absorption properties.

Meanwhile, the method of progressing drying, grinding, and sieving will be explained in more detail.

First, with regard to the drying of the hydrogel polymer, in order to increase the efficiency of the drying step, a step of coarse grinding may be further progressed before drying, as necessary. Here, grinders that can be used in the gel grinding are not limited in terms of the constructions, but specifically, one selected from the group consisting of a vertical pulverizer, a turbo cutter, a turbo grinder, a rotary cutter mill, a cutter mill, a disc mill, a shred crusher, a crusher, a chopper, and a disc cutter may be used, but is not limited thereto.

Through the coarse grinding step, the particle diameter of the hydrogel polymer may be controlled to about 2 to about 10 mm. Grinding to a particle diameter of less than 2 mm would not be technically easy due to the high moisture content of the hydrogel polymer, and may generate agglomeration between the ground particles. Meanwhile, if grinding to a particle diameter greater than 10 mm, the effect of increasing the efficiency of the subsequent drying step may be insignificant.

The hydrogel polymer coarsely ground as explained above, or the hydrogel polymer immediately after polymerization that does not pass through the coarse grinding step is dried, and the drying temperature may be about 50 □ to about 250 □. If the drying temperature is less than about 50 □, a drying time may too long, and the properties of the finally prepared superabsorbent polymer may be deteriorated, and if the drying temperature is greater than about 250 □, only the surface of the hydrogel polymer may be dried, thus generating fine powder in the subsequent grinding process, and the properties of the finally prepared superabsorbent polymer may be deteriorated. Preferably, the drying may be progressed at a temperature of about 150 to 200 □, more preferably at 160 to 190 □. Meanwhile, the drying may be progressed for 20 minutes to 15 hours considering the process efficiency, etc., but is not limited thereto.

The drying method is not limited in terms of the construction as long as it can be commonly used as a drying process of a hydrogel polymer. Specifically, the drying step may be progressed by hot wind supply, infrared ray irradiation, ultrahigh frequency wave irradiation, UV irradiation, etc. The polymer dried by such a method may exhibit a moisture content of about 0.05 to about 10 wt %.

Next, a step of grinding the dried polymer obtained through the above drying step is conducted. The particle diameter of the polymer powder obtained after the grinding step may be 150 μm to 850 μm. As a grinder for grinding to such a particle diameter, specifically, a pin mill, a hammer mill, a screw mill, a roll mill, a disc mill, a jog mill, etc. may be used, but the grinder is not limited thereto.

Further, in order to manage the properties of the superabsorbent polymer powder finally productized after the grinding step, a separate process of sieving the polymer powder obtained after grinding according to the particle diameter may be progressed. Preferably, a polymer with particle diameters of about 150 to about 850 μm may be sieved, and only the polymer powders having such particle diameters may be subjected to surface crosslinking and productized.

The step F) is a step of crosslinking the surface of the base polymer prepared in step E), wherein the base polymer powder is heat treated and surface-crosslinked in the presence of a surface crosslinking solution, thus forming superabsorbent polymer particles.

The surface crosslinking solution may include one or more kinds of crosslinking agents selected from the group consisting of ethylene glycol diglycidyl ether, polyethylene glycol diglycidyl ether, glycerol polyglycidyl ether, propylene glycol diglycidyl ether, polypropylene glycol diglycidyl ether, ethylene glycol, diethylene glycol, propylene glycol, triethylene glycol, tetraethylene glycol, propane diol, dipropylene glycol, polypropylene glycol, glycerin, polyglycerin, butane diol, heptane diol, hexane diol, trimethylol propane, pentaerythritol, sorbitol, calcium hydroxide, magnesium hydroxide, aluminum hydroxide, iron hydroxide, calcium chloride, magnesium chloride, aluminum chloride, and iron chloride. Preferably, ethylene glycol diglycidyl ether may be used.

At this time, it is preferable that the surface crosslinking agent is used in an amount of about 1 part by weight or less, based on 100 parts by weight of the base polymer. Here, the amount of the surface crosslinking agent used, if two or more kinds of surface crosslinking agents are used, means the total amount thereof. If the amount of the surface crosslinking agent used is greater than about 1 part by weight, excessive surface crosslinking may be progressed, and thus the properties of superabsorbent polymer, particularly the degree of dryness, may be deteriorated. It is also preferable that the surface crosslinking agent is used in an amount of about 0.01 parts by weight or more, about 0.02 parts by weight or more, about 0.04 parts by weight or more, or about 0.05 parts by weight or more, based on 100 parts by weight of the base polymer.

The surface crosslinking agent may further include one or more solvents selected from the group consisting of water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methylethylketone, acetone, methyl amyl ketone, cyclohexanone, cyclopentanone, diethylene glycol monomethyl ether, diethylene glycol ethyl ether, toluene, xylene, butyrolactone, carbitol, methyl cellosolve acetate, N,N-dimethylacetamide, etc., and is preferably water. The solvent may be used in an amount of about 0.5 to about 10 parts by weight, based on 100 parts by weight of the base polymer powder.

The surface crosslinking solution may further include aluminum sulfate. The aluminum sulfate may be included in an amount of about 0.02 to about 1.5 parts by weight, based on 100 parts by weight of the base polymer powder.

The surface crosslinking solution may further include inorganic fillers. The inorganic fillers may include silica, aluminum oxide, and silicate. The organic fillers may be included in an amount of about 0.01 to about 0.5 parts by weight, based on 100 parts by weight of the base polymer powder.

The surface crosslinking solution may further include a thickener. If the surface of the base polymer powder is further crosslinked in the presence of a thickener, property deterioration may be minimized. Specifically, as the thickener, one or more kinds selected from polysaccharides and hydroxyl-containing polymer may be used. As the polysaccharides, a gum-based thickener, a cellulose-based thickener, etc. may be used. Specific examples of the gum-based thickener may include xanthan gum, arabic gum, karaya gum, tragacanth gum, ghatti gum, guar gum, locust bean gum, psyllium seed gum, etc., and specific examples of the cellulose-based thickener may include hydroxypropyl methylcellulose, carboxymethyl cellulose, methylcellulose, hydroxymethyl cellulose, hydroxyethyl cellulose, hydroxypropylcellulose, hydroxyethyl methyl cellulose, hydroxymethyl propyl cellulose, hydroxyethylhydroxypropyl cellulose, ethylhydroxyethyl cellulose, methylhydroxypropyl cellulose, etc. Specific examples of the hydroxyl-containing polymer may include polyethylene glycol, polyvinyl alcohol, etc.

In order to conduct the surface crosslinking, a surface crosslinking solution and a base polymer may be put in a reactor and mixed, a surface crosslinking solution may be sprayed to the base polymer, the base polymer and surface crosslinking solution may be continuously fed to a continuously operated mixer, and the like.

The surface crosslinking may be progressed at a temperature of about 100 to about 250 □, and it may be continuously conducted after the steps of drying and grinding progressed at a relatively high temperature. At this time, the surface crosslinking reaction may be progressed for about 1 to about 120 minutes, about 1 to about 100 minutes, or about 10 to about 60 minutes. That is, in order to induce a surface crosslinking reaction to the minimum and to prevent damage to polymer particles due to an excessive reaction and the resulting deterioration of the properties, the surface crosslinking reaction may be progressed under the above-explained conditions.

The superabsorbent polymer prepared by the above-explained preparation method of the present invention may have excellent absorption performance.

Specifically, the superabsorbent polymer according to the present invention has centrifuge retention capacity (CRC) for a saline solution (0.9 wt % sodium chloride aqueous solution) for 30 minutes of 30 g/g or more. A method for measuring the centrifuge retention capacity will be explained in the examples below. Preferably, the centrifuge retention capacity is 30.5 g/g or more, or 31 g/g or more. Further, the higher the centrifuge retention capacity value is, the better the superabsorbent polymer is, and while the upper limit is not substantially limited, it may be, for example, 35 g/g or less, 34 g/g or less, or 33 g/g or less.

Preferably, the superabsorbent polymer according to the present invention has absorbency under pressure of 0.7 psi (0.7 AUP) for a saline solution (0.9 wt % sodium chloride aqueous solution) for 1 hour of 15 g/g or more. A method for measuring the centrifuge retention capacity will be explained in the examples below. Preferably, the 0.7 AUP is 20 g/g or more, or 8.0 g/g or more. Further, the higher the absorbency under pressure value is, the better the superabsorbent polymer is, and while the upper limit is not substantially limited, it may be, for example, 40 g/g or less, 35 g/g or less, or 30 g/g or less.

The superabsorbent polymer according to the present invention has a rate of particles having a particle diameter of 150 to about 850 μm of about 90% or more.

Hereinafter, the actions and effects of the invention will be explained in detail through specific examples of the invention. However, there examples are presented only as illustrations of the invention, and the scope of the right of the invention is not determined thereby.

EXAMPLES

Into a 20 L container made of SUS capable of controlling a temperature, 4500 g of acrylic acid containing 100 ppmw of monomethylether hydroquinone and 8147 g of NaOH diluted to 24% were slowly introduced while stirring. When the temperature of the neutralized solution reached 45 □, 5 g of methylenebisacrylamide (MAAA) dissolved in 500 g of acrylic acid was introduced and continuously stirred. An air diffuser was installed at the bottom of the container, and while introducing an oxygen-containing gas at a rate of 50 L per minute, the mixture was stirred for 30 minutes.

In an inlet at the upper part of a monoaxial kneader (manufactured by LIST company) capable of continuous introduction and discharge, an in-line homogenizer (Megatron MT 3000, equipped with 4 inlets and 1 outlet) was installed, and using a gear pump, 800 g of the neutralized solution per minute, 30 g of 0.2% ascorbic acid per minute, and 30 g of a 0.7% hydrogen peroxide solution per minute were introduced into each inlet, nitrogen gas was introduced into another inlet at a rate of 20 L per minute, and the homogenizer was rotated at 6000 rpm per minute to mix the solutions and gas. The solutions and gas mixed in the homogenizer were introduced into the kneader through the outlet.

After the neutralized solution was introduced into the kneader, a gel was formed and foaming was generated. The gel was finely divided by a strain applied by a rotating body therein, and discharged outside of the kneader, and the size of the gel was 5 mm to 50 mm. The gel was chopped using a meat chopper to further finely divide to the average gel size of a 5 mm level.

The resultant was dried in an oven capable of transferring the direction of wind up and down. Hot air of 18 5□ was flowed from the lower side to the upper side for 15 minutes, and flowed from the upper side to the lower side for 15 minutes so as to uniformly dry, and after drying, the moisture content of the dried body was 2% or less. The resultant was ground with a grinder, and then sieved for 10 minutes using standard test sieves (#20, #30, #50, #100) and a sieve shaker, thus obtaining a polymer with a particle size of 150 μm to 850 μm, and the base polymer powder was obtained by this method.

Thereafter, 100 parts by weight of the base polymer prepared above was uniformly mixed with a surface crosslinking solution (4 parts by weight of water, 3 parts by weight of methanol, 0.15 parts by weight of ethylene glycol diglycidyl ether (EX-810), 0.3 parts by weight of propylene glycol (PG), 0.15 parts by weight of aluminum sulfate 18 hydrate, and 0.1 parts by weight of fumed silica (Aerosil 200)), and then a surface crosslinking reaction was progressed at 140 □ for 30 minutes. After the reaction was completed, the polymer was sieved using a standard test sieve to obtain particles of 150 μM to 850 μm.

The process conditions of the examples and comparative examples are summarized in the following Table 1.

(The amount of the initiator was described as a relative amount, based on 100 of the ascorbic acid and hydrogen peroxide solution described in the examples).

TABLE 1

| | MEHQ content (ppmw) | Neutralization temperature (□) | Initiator | Use of gas | Transfer line state |
|---|---|---|---|---|---|
| Example 1 | 100 | 40 | 100 | Stand by | Good |
| Example 2 | 200 | 60 | 50 | Stand by | Good |
| Example 3 | 100 | 80 | 20 | $O_2$ | Good |
| Comparative Example 1 | 100 | 40 | 100 | Non-introduced | Polymerization product was generated in the DMS outlet, 10 minutes after beginning of transfer |
| Comparative Example 2 | 0 | 40 | 100 | Stand by | Polymerization product was generated in the DMS outlet, 3 minutes after beginning of transfer |
| Comparative Example 3 | 200 | 60 | 50 | Non-introduced | Polymerization product was generated in the DMS outlet, 2 minutes after beginning of transfer |
| Comparative Example 4 | 200 | 80 | 20 | Non-introduced | Polymerization product was generated in the DMS outlet, immediately after beginning of transfer |

In Examples 1 to 3, dissolved oxygen amounts immediately before introduction of the oxygen-containing gas (DO1), immediately after introduction of the oxygen-containing gas (DO2), and immediately after removing oxygen by the introduction of nitrogen (DO3) were measured and are summarized in the following Table 2.

TABLE 2

| | DO1 (mg/L) | DO2 (mg/L) | DO3 (mg/L) |
|---|---|---|---|
| Example 1 | 3.2 | 7.2 | 0.8 |
| Example 2 | 3.9 | 6.8 | 0.9 |
| Example 3 | 3.0 | 6.4 | 0.7 |

The properties of the base polymer and the superabsorbent polymer prepared in the examples and comparative examples are summarized in the following Table 3.

TABLE 3

| | Base polymer | Superabsorbent polymer | |
|---|---|---|---|
| | CRC (g/g) | CRC (g/g) | AUP (g/g) |
| Example 1 | 40 | 34 | 22 |
| Example 2 | 38 | 34 | 24 |
| Example 3 | 37 | 33 | 26 |
| Comparative Example 1 | 40 | 34 | 22 |
| Comparative Example 2 | 37 | 33 | 24 |
| Comparative Example 3 | 38 | 34 | 24 |
| Comparative Example 4 | — | — | — |

Referring to Table 1, it is confirmed that in the case of the examples of the present invention, by the introduction of oxygen, no problem was generated in the DMS outlet, and trouble was not generated in the continuous process, while in the case of the comparative examples, after beginning of transfer, a polymerization product was generated in the DMS outlet, thus generating process trouble.

Particularly, in the case of Comparative Example 4, it is confirmed that immediately after beginning of transfer, a problem was generated in the DMS outlet, and thus a process could not be progressed at all, and an absorbent polymer could not be prepared by a continuous process.

Meanwhile, it is confirmed that the base polymer and the superabsorbent polymer prepared according to the examples of the present invention have good centrifuge retention capacity and absorbency under pressure.

The invention claimed is:

1. A method for preparing a superabsorbent polymer comprising:
  A) introducing an oxygen-containing gas into an aqueous monomer mixture comprising water soluble ethylenically unsaturated monomers having acid groups of which at least a part are neutralized, a crosslinking agent, and a polymerization inhibitor that inhibits polymerization of the water soluble ethylenically unsaturated monomers in the presence of oxygen to form the aqueous monomer mixture into which the oxygen-containing gas is introduced;
  B) transferring the aqueous monomer mixture into which the oxygen-containing gas is introduced to a polymerization reactor;
  C) removing oxygen from the aqueous monomer mixture into which the oxygen-containing gas is introduced immediately before the aqueous monomer mixture into which the oxygen-containing gas is introduced is introduced into the polymerization reactor; and
  D) progressing crosslinking polymerization of the water soluble ethylenically unsaturated monomers in the polymerization reactor, to form a hydrogel polymer comprising a first crosslinked polymer.

2. The method for preparing a superabsorbent polymer according to claim 1, further comprising:
  E) drying, grinding, and sieving the hydrogel polymer to form a base polymer powder; and
  F) in the presence of a surface crosslinking solution, heat treating the base polymer powder to progress surface crosslinking, thus forming superabsorbent polymer particles.

3. The method for preparing a superabsorbent polymer according to claim 1, wherein the aqueous monomer mixture is transferred and introduced into the polymerization reactor at a temperature of 40° C. to 90° C.

4. The method for preparing a superabsorbent polymer according to claim 1, wherein the oxygen-containing gas is introduced into the aqueous monomer mixture such that a dissolved oxygen rate represented by Mathematical Formula 1 is greater than 1.0 and equal to or less than 2.5:

$$DO2/DO1 \quad \text{[Mathematical Formula 1]}$$

wherein, in Mathematical Formula 1,
  DO1 is the amount of dissolved oxygen in mg/L in the aqueous monomer mixture, measured immediately before introducing an oxygen-containing gas into the aqueous monomer mixture, and
  DO2 is the amount of dissolved oxygen in Mg/L in the aqueous monomer mixture, measured immediately after introducing an oxygen-containing gas into the aqueous monomer mixture.

5. The method for preparing a superabsorbent polymer according to claim 1, wherein during C) removing oxygen from the aqueous monomer mixture, an inert gas is introduced into the aqueous monomer mixture to remove oxygen.

6. The method for preparing a superabsorbent polymer according to claim 1, wherein C) removing oxygen from the aqueous monomer mixture is progressed such that a dissolved oxygen rate represented by the following Mathematical Formula 2 is 0.01 to 0.5:

$$DO3/DO2 \quad \text{[Mathematical Formula 2]}$$

wherein, in the Mathematical Formula 2,
  DO2 is the amount of dissolved oxygen in mg/L in the aqueous monomer mixture, measured immediately after introducing an oxygen-containing gas into the aqueous monomer mixture, and
  DO3 is the amount of dissolved oxygen in mg/L in the aqueous monomer mixture, measured immediately after removing oxygen from the aqueous monomer mixture.

7. The method for preparing a superabsorbent polymer according to claim 1, further comprising introducing a thermal polymerization initiator into the aqueous monomer mixture, after removing oxygen from the aqueous monomer mixture and before progressing crosslinking polymerization of the water soluble ethylenically unsaturated monomers in the polymerization reactor.

8. The method for preparing a superabsorbent polymer according to claim 1, wherein the polymerization inhibitor is included in a content of 10 ppmw to 300 ppmw, based on a weight of the water soluble ethylenically unsaturated monomers having acid groups of which at least a part are neutralized.

9. The method for preparing a superabsorbent polymer according to claim 1, wherein the superabsorbent polymer has centrifuge retention capacity (CRC) of 30 g/g or more, and absorbency under pressure of 0.7 psi of 15 g/g or more.

10. The method for preparing a superabsorbent polymer according to claim 1, wherein the water soluble ethylenically unsaturated monomers are added in an amount of 20 to 90 wt % based on the aqueous monomer mixture.

11. The method for preparing a superabsorbent polymer according to claim 1, wherein the crosslinking agent is added in an amount of about 0.001 to about 1 part by weight, based on 100 parts by weight of the water soluble ethylenically unsaturated monomers.

12. The method for preparing a superabsorbent polymer according to claim 7, wherein the thermal polymerization initiator is introduced in an amount of about 0.05 to about 0.5 parts by weight, based on 100 parts by weight of the ethylenically unsaturated monomers.

* * * * *